United States Patent
Nakano et al.

(10) Patent No.: US 8,076,904 B2
(45) Date of Patent: Dec. 13, 2011

(54) CIRCUIT FOR DETECTING REMAINING BATTERY CAPACITY

(75) Inventors: Itsuki Nakano, Atsugi (JP); Akira Ikeuchi, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 354 days.

(21) Appl. No.: 11/706,484

(22) Filed: Feb. 12, 2007

(65) Prior Publication Data
US 2007/0188146 A1    Aug. 16, 2007

(30) Foreign Application Priority Data

Feb. 13, 2006    (JP) ................................. 2006-035595
Jan. 31, 2007    (JP) ................................. 2007-022197

(51) Int. Cl.
*H02J 7/00*    (2006.01)
(52) U.S. Cl. .................. 320/132; 320/149; 324/428
(58) Field of Classification Search .................. 320/132, 320/133, 134, 149; 324/427, 428
See application file for complete search history.

(56) References Cited

U.S. PATENT DOCUMENTS

| | | | |
|---|---|---|---|
| 5,563,496 A * | 10/1996 | McClure | 320/128 |
| 5,606,242 A * | 2/1997 | Hull et al. | 320/106 |
| 5,774,733 A | 6/1998 | Nolan et al. | |
| 6,025,695 A * | 2/2000 | Friel et al. | 320/106 |
| 2006/0267552 A1* | 11/2006 | Baer et al. | 320/128 |

FOREIGN PATENT DOCUMENTS

| | | |
|---|---|---|
| JP | 10-503882 | 6/1998 |
| JP | 11-283677 | 10/1999 |
| JP | 2001-174534 | 6/2001 |

OTHER PUBLICATIONS

Japanese Office Action dated Apr. 19, 2011 relating to JP2007-022197, and its partial English-language translation.

* cited by examiner

*Primary Examiner* — Edward Tso
*Assistant Examiner* — Aaron Piggush
(74) *Attorney, Agent, or Firm* — Ladas & Parry, LLP

(57) ABSTRACT

A disclosed circuit for detecting remaining battery capacity includes: a current detection unit detecting a charge and discharge current of a battery; a remaining capacity measurement unit measuring remaining capacity of the battery by integrating the charge and discharge current at first time intervals when the charge and discharge current detected in the current detection unit is not more than a predetermined value and at second time intervals shorter than the first time intervals when the charge and discharge current exceeds the predetermined value; and an interrupt signal generation unit generating an interrupt signal when the charge and discharge current exceeds a reference value and instructing the remaining capacity measurement unit to measure remaining capacity of the battery.

9 Claims, 9 Drawing Sheets

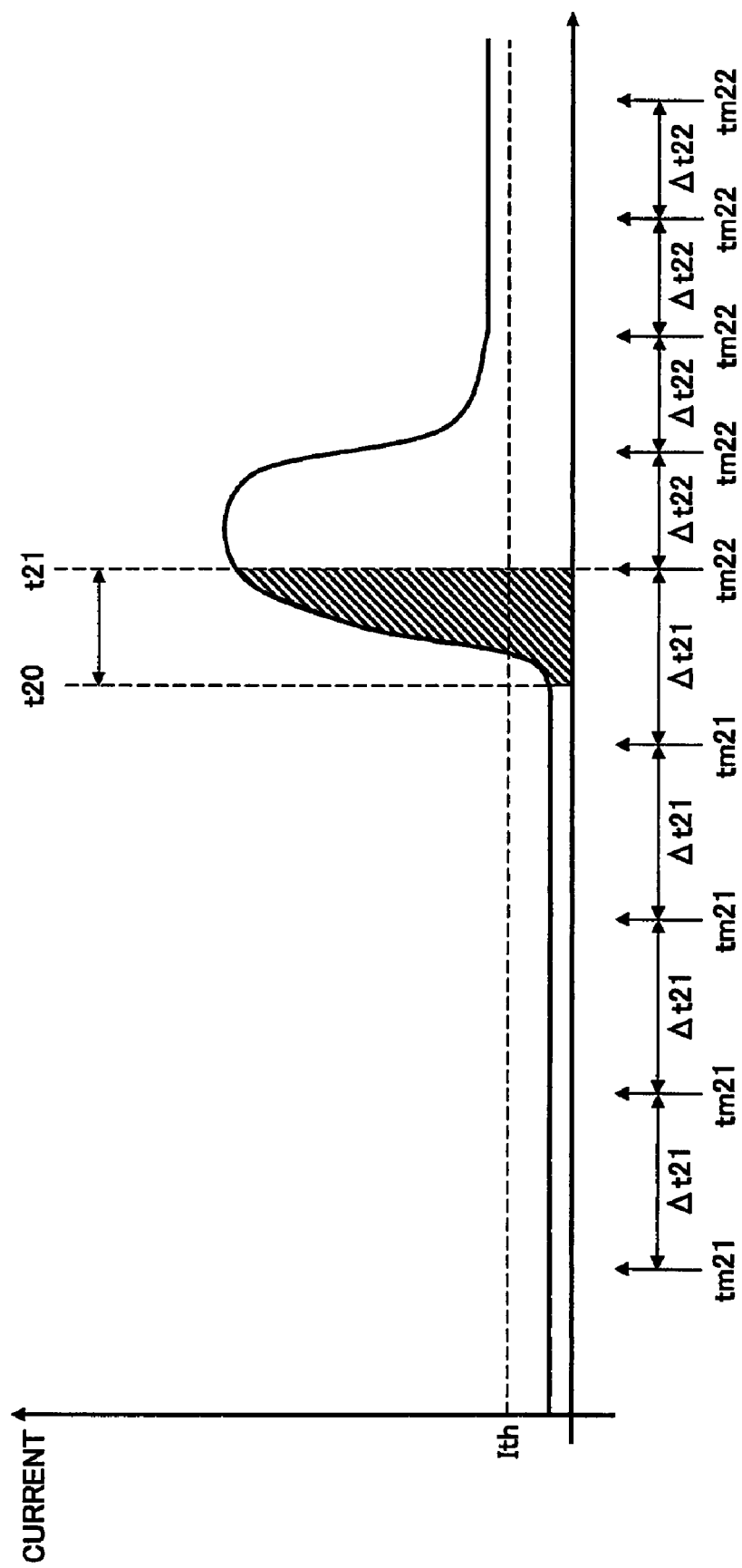

CIRCUIT FOR DETECTING REMAINING BATTERY CAPACITY

BACKGROUND OF THE INVENTION

1. Field of the Invention

The present invention generally relates to a circuit for detecting remaining battery capacity and particularly to a circuit for detecting remaining battery capacity in which the remaining battery capacity is detected based on a charge and discharge current of the battery.

2. Description of the Related Art

In recent years, lithium ion batteries have been installed on mobile devices such as digital cameras. The lithium ion batteries are generally considered to be difficult to detect remaining battery capacity based on a battery voltage thereof. Accordingly, a method for measuring remaining battery capacity is employed in which the capacity is measured by integrating a charge and discharge current of the battery (refer to Patent Document 1).

For example, it is very important for digital cameras to reduce waiting time as much as possible before the cameras are ready for shooting from power-on. It is known that the time required to be able to take a picture upon power-on is reduced in proportion as consumption current upon power-on is increased.

When a circuit for detecting remaining battery capacity is used in which a charge and discharge current is integrated, if a large consumption current upon power-on is not detected, a margin of error of remaining battery capacity is increased. This is due to the fact that the circuit for detecting remaining battery capacity consumes current per se and the circuit for detecting remaining battery capacity intermittently measures the current so as to control the current consumption.

Patent Document 1: Japanese Laid-Open Patent Application No. 2001-174534

FIG. 8 is an illustration of operations of an example of a conventional circuit for detecting remaining battery capacity. In FIG. 8, tm 11 and tm 12 indicate measurement time, Δt 11 and Δt 12 (Δt 11>Δt 12) indicate measurement intervals.

For example, while a load is powered off, measurement is conducted at relatively long measurement intervals Δt 11 (several minutes, for example) so as to reduce consumption current in the circuit for detecting remaining battery capacity because a change of the consumption current and the consumption current per se are small. By contrast, upon powering on the load, measurement is conducted at relatively short measurement intervals Δt 12 (several seconds, for example) because the consumption current is greatly changed in accordance with a status of the load.

When the load is powered on at time t 10 as shown in FIG. 8, remaining capacity is detected at measurement intervals Δt 12 from time t 11 after the measurement interval Δt 11 has elapsed from the last measurement time tm 11. In accordance with this, it is impossible to detect relatively large current consumption upon powering on the load shown in slashes in FIG. 8 depending on measurement time tm 11. Thus, when powering on and off is repeated, it is impossible to accurately detect remaining battery capacity.

In order to solve this, measurement intervals may be reduced as shown in FIG. 9. FIG. 9 is an illustration of operations of another example of a conventional circuit for detecting remaining battery capacity. In FIG. 9, tm 21 and tm 22 indicate measurement time, Δt 21 and Δt 22 (Δt 21>Δt 22) indicate measurement intervals.

In FIG. 9, measurement intervals Δt 21 while the load is powered off (several tens of seconds, for example) are set to be shorter than the measurement intervals Δt 11 while the load is powered off shown in FIG. 8. In accordance with this, upon powering on the load at time t 20 as shown in FIG. 9, remaining capacity is detected at measurement intervals Δt 22 from time t 21 after the measurement interval Δt 21 has elapsed from the last measurement time tm 21. Accordingly, although current consumption upon powering on the load shown in slashes in FIG. 9 is not detected, a margin of error of remaining battery capacity is reduced in comparison with FIG. 8.

However, the method shown in FIG. 9 is problematic in that current consumption is increased in the circuit for detecting remaining battery capacity because the measurement intervals Δt 21 while the load is powered off are short.

Thus, conventional circuits for detecting remaining battery capacity has a problem in that it is impossible to measure large current consumption upon powering-on, for example, depending on a process time for measuring remaining capacity and it is impossible to conduct accurate detection of remaining capacity.

SUMMARY OF THE INVENTION

It is a general object of the present invention to provide an improved and useful circuit for detecting remaining battery capacity in which the above-mentioned problems are eliminated.

A more specific object of the present invention is to provide a circuit for detecting remaining battery capacity that can reduce consumption current and conduct accurate detection of remaining battery capacity.

According to one aspect of the present invention, there is provided a circuit for detecting remaining battery capacity, comprising: a current detection unit detecting a charge and discharge current of a battery; a remaining capacity measurement unit measuring remaining capacity of the battery by integrating the charge and discharge current at first time intervals when the charge and discharge current detected in the current detection unit is not more than a predetermined value and at second time intervals shorter than the first time intervals when the charge and discharge current exceeds the predetermined value; and an interrupt signal generation unit generating an interrupt signal when the charge and discharge current exceeds a reference value and instructing the remaining capacity measurement unit to measure remaining capacity of the battery. Thus, it is possible to reduce consumption current and conduct accurate detection of remaining battery capacity.

According to another aspect of the present invention, in the circuit for detecting remaining battery capacity, the current detection unit detects a voltage between both ends of a resistance where the charge and discharge current passes through, and the interrupt signal generation unit generates the interrupt signal when the voltage between both ends of the resistance where the charge and discharge current passes through exceeds a first reference value and when the voltage between both ends of the resistance where the charge and discharge current passes through is less than a second reference value lower than the first reference value.

According to another aspect of the present invention, in the circuit for detecting remaining battery capacity, the interrupt signal generation unit includes a window comparator.

According to the present invention, it is possible to reduce consumption current and conduct accurate detection of remaining battery capacity.

Other objects, features and advantage of the present invention will become more apparent from the following detailed description when read in conjunction with the accompanying drawings.

BRIEF DESCRIPTION OF THE DRAWINGS

FIG. 9 is an illustration of operations of another example of a conventional circuit for detecting remaining battery capacity.

DETAILED DESCRIPTION OF THE PREFERRED EMBODIMENTS

Figure 1:
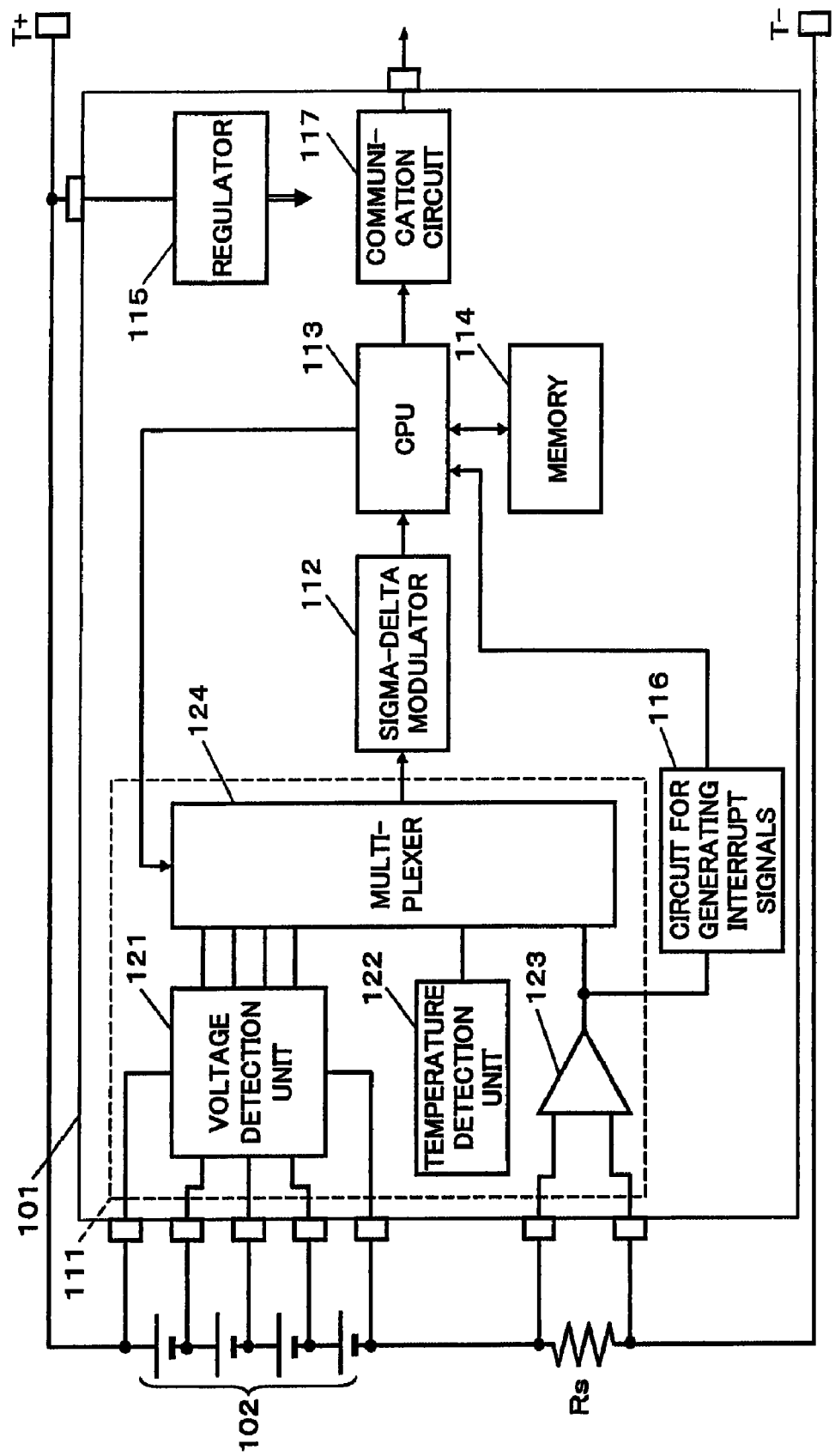
FIG. 1 a block diagram of an embodiment of a circuit for detecting remaining battery capacity according to the present invention.

FIG. 1 a block diagram of an embodiment of a circuit for detecting remaining battery capacity according to the present invention. In FIG. 1, a circuit for detecting remaining battery capacity 101 is formed on a single semiconductor substrate, for example, and includes a detection unit 111, a sigma-delta modulator 112, a CPU 113, a memory 114, a regulator 115, a circuit for generating interrupt signals 116, and a communication circuit 117.

The detection unit 111 includes a voltage detection unit 121, a temperature detection unit 122, a current detection unit 123, and a multiplexer 124.

The voltage detection unit 121 is connected to both ends of a battery 102 and detects a voltage of the battery 102. A detection signal detected in the voltage detection unit 121 is supplied to the multiplexer 124. The temperature detection unit 122 detects ambient temperature, generates a detection signal in accordance with the ambient temperature, and outputs the detection signal. The detection signal in the temperature detection unit 122 is supplied to the multiplexer 124.

The current detection unit 123 includes a differential amplifier, for example, and is connected to both ends of a current detection resistance Rs connected between the battery 102 and a terminal T−. The current detection unit 123 detects a voltage generated in the current detection resistance Rs in accordance with a current passing through the current detection resistance Rs and outputs a detection signal in accordance with a charge and discharge current of the battery 102.

In this case, the detection signal becomes a reference voltage V0 when the charge and discharge current is not passing through the battery 102. When the charge current is passing through the battery 102, the detection signal has a value exceeding the reference voltage V0. When the discharge current is passing through the battery 102, the detection signal has a value less than the reference voltage V0 and is output.

The detection signal of the current detection unit 123 is supplied to the circuit for generating interrupt signals 116 and the multiplexer 124.

The multiplexer 124 selects one of the detection signal of the voltage detection unit 121, the detection signal of the temperature detection unit 122, and the detection signal of the current detection unit 123 based on a control signal from the CPU 113 and supplies the selected signal to the sigma-delta modulator 112.

The circuit for generating interrupt signals 116 generates an interrupt signal based on the detection signal from the current detection unit 123 and supplies the interrupt signal to the CPU 113.

The sigma-delta modulator 112 performs PDM (pulse density modulation), namely, 1-bit digital modulation, on analog signals from the multiplexer 124 and supplies the modulated signal to the CPU 113.

The CPU 113 executes a digital filter process program stored in the memory 114 and converts PDM signals into multiple-bit digital values, namely, PCM (pulse code modulation) data. Further, the CPU 113 executes a remaining capacity calculation program process and calculates remaining capacity of the battery 102. The CPU described in the present invention includes a processor such as a microprocessor.

The communication circuit 117 transmits the remaining battery capacity calculated in the CPU 113 to an external circuit. The regulator 115 obtains power supply from the battery 102, generates a power supply voltage required in the circuit for detecting remaining battery capacity 101, and supplies the power supply voltage to each unit of the circuit for detecting remaining battery capacity 101.

[Structure of the Circuit for Generating Interrupt Signals]

Figure 2:
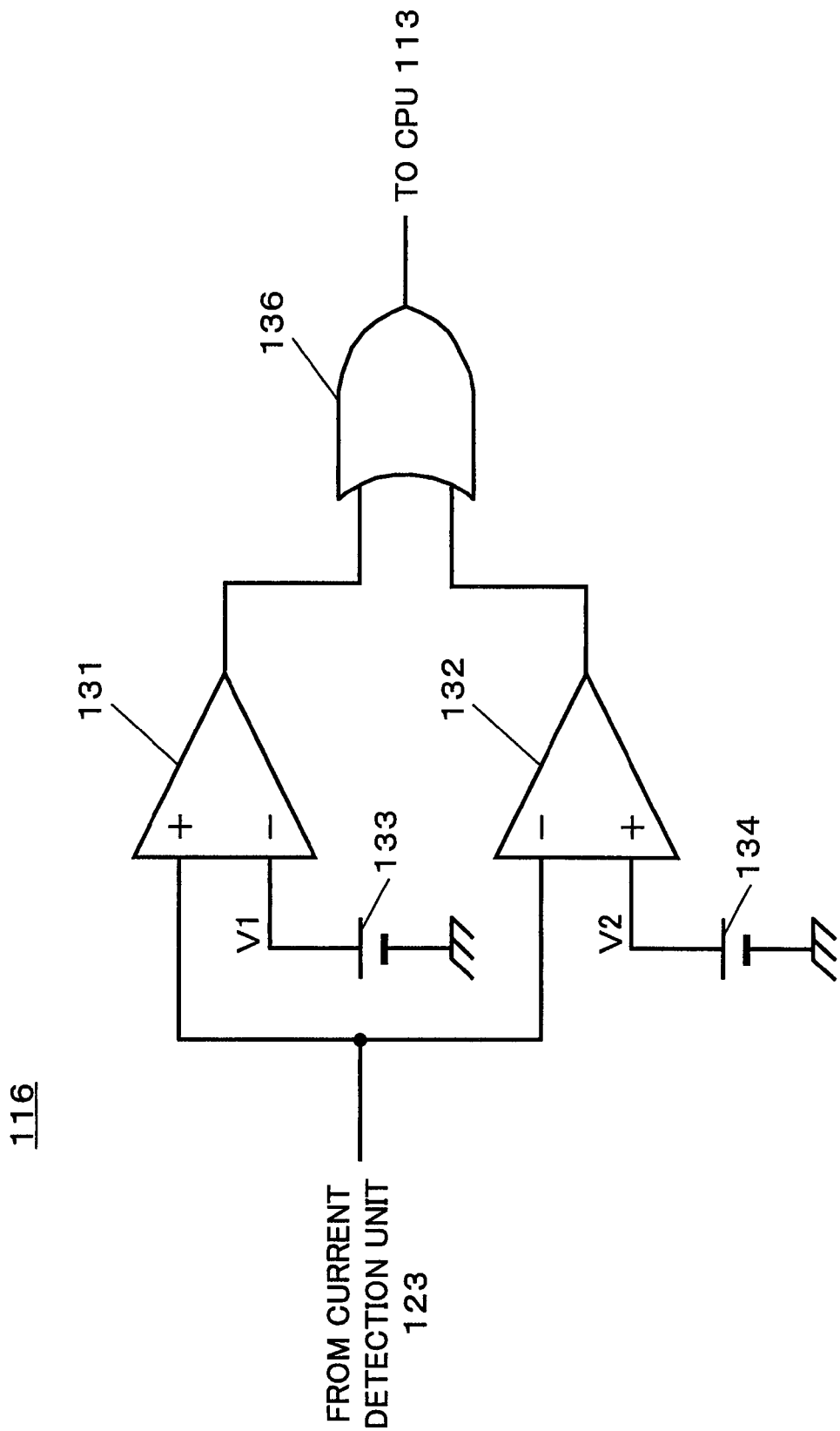
FIG. 2 is a block diagram of a circuit for generating interrupt signals.
Figure 3:
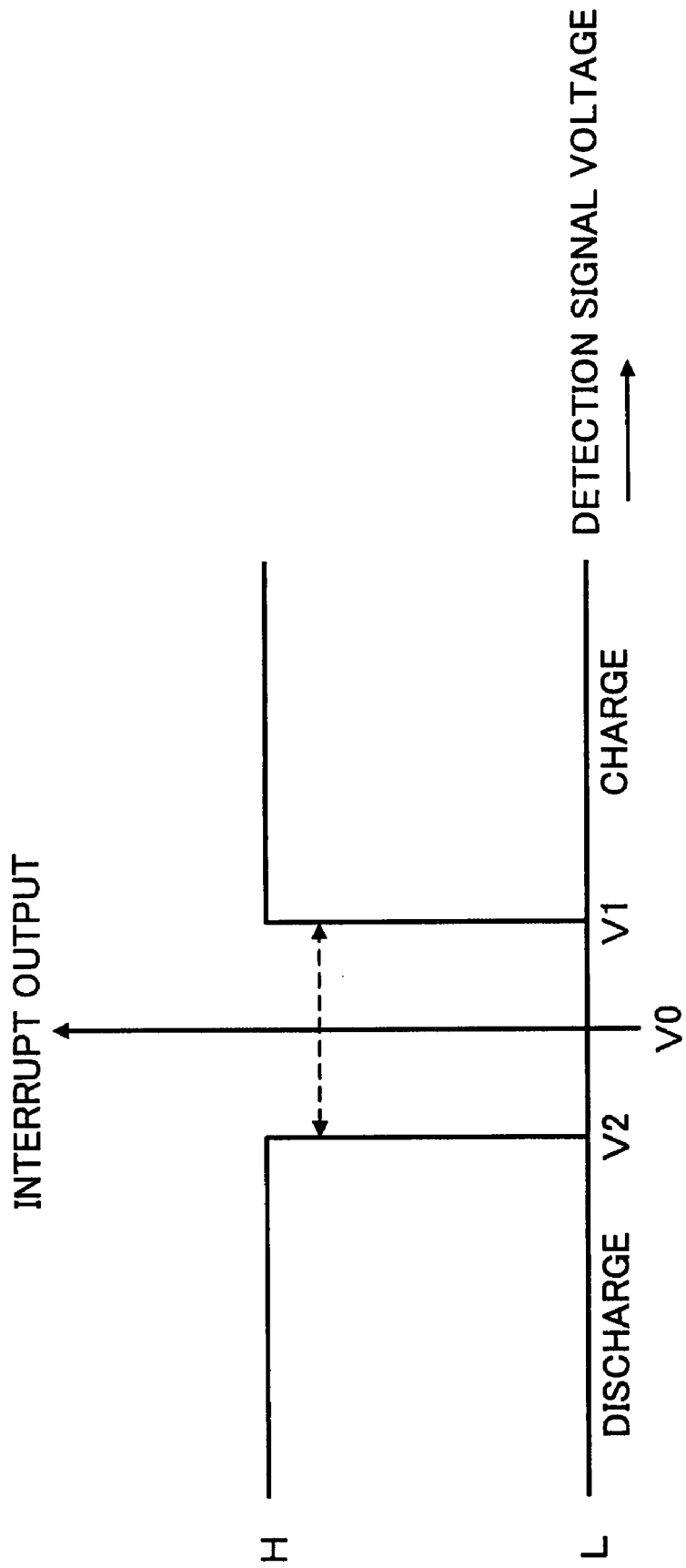
FIG. 3 is an illustration of operations of a circuit for generating interrupt signals.

FIG. 2 is a block diagram of the circuit for generating interrupt signals 116. FIG. 3 is an illustration of operations of the circuit for generating interrupt signals 116.

The circuit for generating interrupt signals 116 includes comparators 131 and 132, a reference voltage source 133 for generating a first reference voltage V1, a reference voltage source 134 for generating a second reference voltage V2, and an OR gate 136. The circuit for generating interrupt signals 116 constitutes a window comparator in which an output reaches a low level only when an input voltage is between the first reference voltage (first reference value) V1 and the second reference voltage (second reference value) V2 as shown in FIG. 3.

In the comparator 131, the detection signal of the current detection unit 123 is supplied to a noninverting input terminal and the first reference voltage V1 from the reference voltage source 133 is supplied to an inverting input terminal. The first reference voltage V1 is set as a voltage higher than the reference voltage V0 of the detection signal (about 0.8 V, for example) by 500 mV, for example. In addition, voltage difference |V1−V0|=|V2−V1| corresponds to a threshold current Ith (about 50 mA, for example).

In the comparator 131, an output reaches a high level when the detection signal is higher than the first reference voltage V1 and a low level when the detection signal is lower then the first reference voltage V1. The output of the comparator 131 is supplied to the OR gate 136.

In the comparator 132, the second reference voltage V2 from the reference voltage source 134 is supplied to a noninverting input terminal and the detection signal of the current detection unit 123 is supplied to an inverting input terminal. The second reference voltage V2 is set as a voltage lower than the reference voltage V0 by 500 mV, for example.

In the comparator 132, an output reaches a low level when the detection signal is higher than the second reference voltage V2 and a high level when the detection signal is lower then second reference voltage V2. The output of the comparator 132 is supplied to the OR gate 136.

The OR gate 136 outputs an OR logic based on the output of the comparator 131 and the output of the comparator 132. The output of the OR gate 136 reaches a low level when the detection signal is between the first reference voltage V1 and the second reference voltage V2 as shown in FIG. 3. And, the output of the OR gate 136 reaches a high level when the detection signal is higher than the first reference voltage V1 and when the detection signal is lower than the second reference voltage V2. The output of the OR gate 136 is supplied to the CPU 113 as an interrupt signal.

Figure 4:
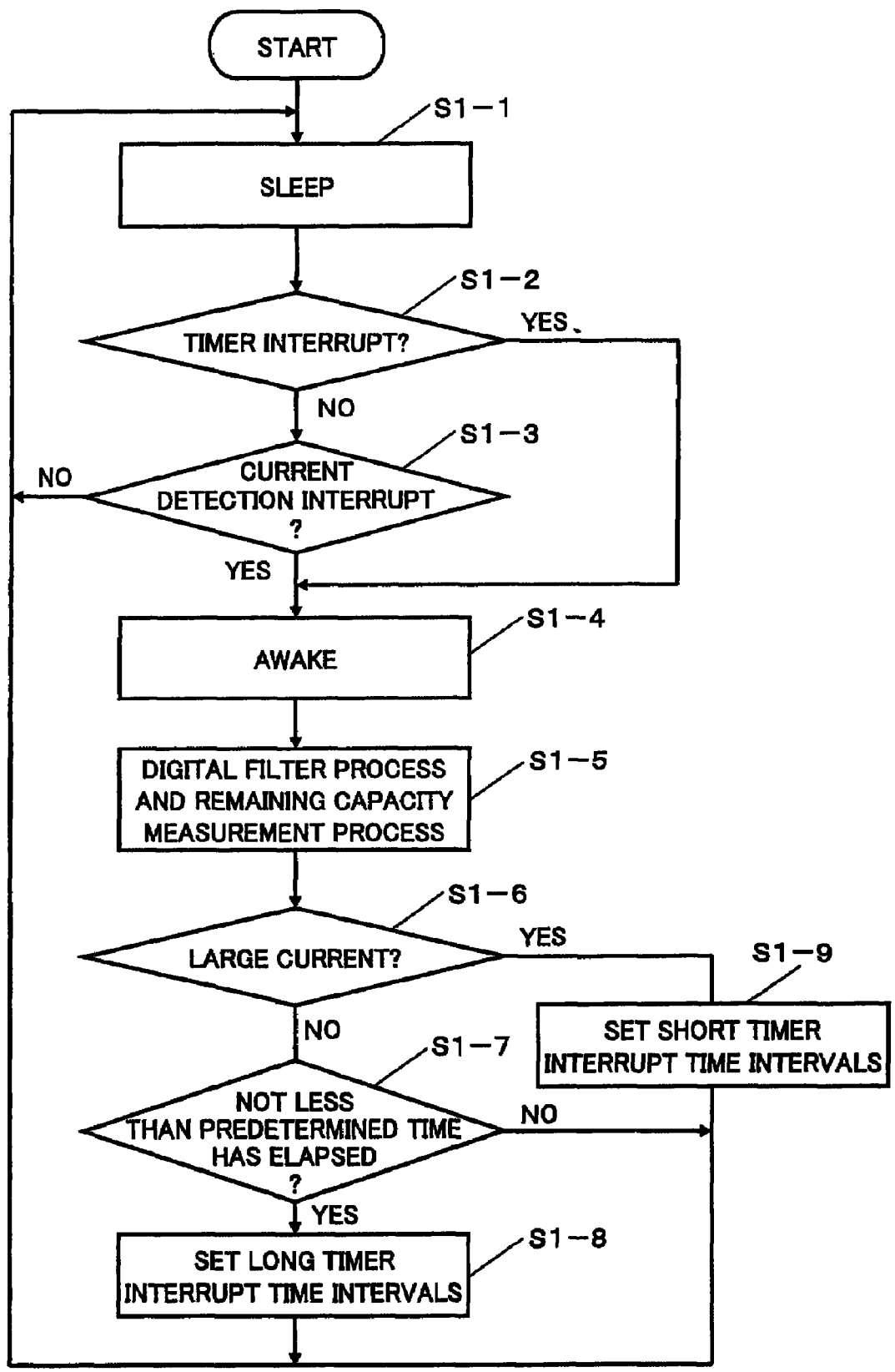
FIG. 4 is a flowchart of a process of CPU.

FIG. 4 is a flowchart of a process of the CPU 113. The CPU 113 is normally in a sleep status and starts up at each time set in a built-in interrupt timer so as to perform a digital filter process and a remaining capacity measurement process.

In FIG. 4, the CPU 113 enters a sleep status in step S1-1, where supply of an operating current to each circuit in the circuit for detecting remaining battery capacity 101 is stopped except the current detection unit 123, circuit for generating interrupt signals 116, CPU 113, and memory 114.

In CPU 113, when the interrupt timer generates a timer interrupt in step S1-2, the CPU 113 enters an awake status from the sleep status in step S1-4. Then, the CPU 113 controls the multiplexer 124 in step S1-5 so as to select each detection signal of voltage, temperature, charge and discharge current sequentially from each of the voltage detection unit 121, temperature detection unit 122, and current detection unit 123. The CPU 113 converts the selected detection signals into PDM signals using the sigma-delta modulator 112, takes in the converted PDM signals, and performs the digital filter process and the remaining capacity measurement process, thereby measuring remaining battery capacity.

On the other hand, when the timer interrupt is not generated in step S1-2, the process proceeds to step S1-3, where the CPU 113 judges whether a current detection interrupt is generated in the circuit for generating interrupt signals 116. When the current detection interrupt is not generated, the process proceeds to step S1-1, enters a sleep status, and repeats steps S1-1 to S1-3.

When the current detection interrupt is generated in the circuit for generating interrupt signals 116 in step 1-3, the CPU 113 enters the awake status from the sleep status in step S1-4. Then, the CPU 113 controls the multiplexer 124 in step S1-5 so as to select each detection signal of voltage, temperature, charge and discharge current sequentially from each of the voltage detection unit 121, temperature detection unit 122, and current detection unit 123. The CPU 113 converts the selected detection signals into PDM signals using the sigma-delta modulator 112, takes in the converted PDM signals, and performs the digital filter process and the remaining capacity measurement process, thereby measuring remaining battery capacity.

When the interrupt signal from the circuit for generating interrupt signals 116 is inverted from a low level to a high level, the CPU 113 recognizes the inversion as an interrupt.

Following the process performed in step S1-4 and S1-5, the CPU 113 judges whether the charge and discharge current detected in the current detection unit 123 in step S1-6 is a large current exceeding a predetermined value (about 10 to 50 mA, for example).

When the charge and discharge current is a small current not more than the predetermined value, namely, when a terminal T+ and the terminal T− are disconnected from the load, for example, the process judges whether this status (charge and discharge current is a small current) is maintained for a predetermined time (several minutes, for example) in step S1-7. When this status is not maintained for the predetermined time, the process proceeds to step S1-1. When this status is maintained for the predetermined time, the CPU 113 sets timer interrupt time intervals of the interrupt timer to a long value $\Delta t1$ ($\Delta t1 > \Delta t2$) in step S1-8, and then the process proceeds to step S1-1.

When the charge and discharge current is a large current exceeding the predetermined value, namely, when the terminal T+ and the terminal T− are connected to the load, the CPU 113 sets the timer interrupt time intervals of the interrupt timer to a short value $\Delta t2$ in step S1-9, and then the process proceeds to step S1-1.

Figure 5:
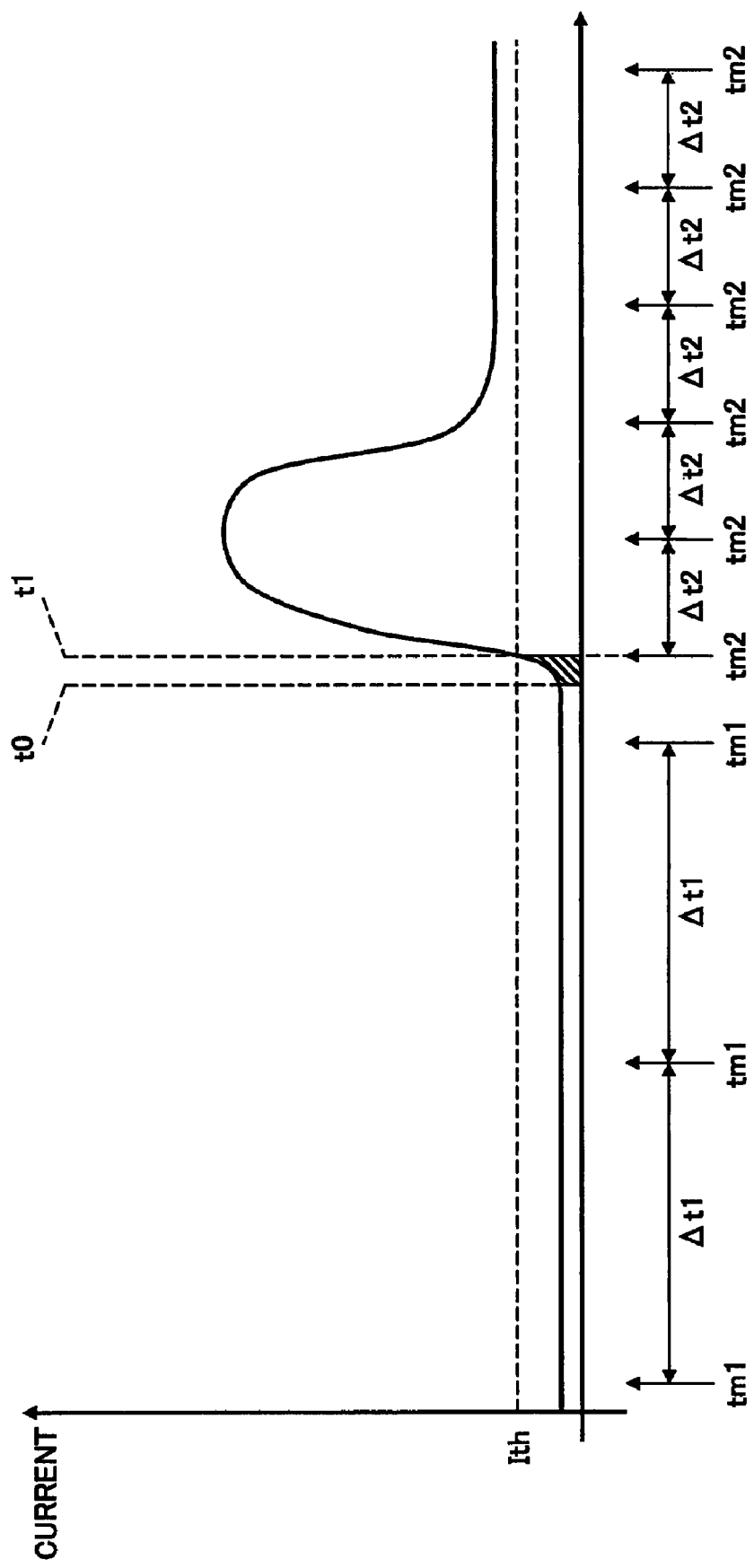
FIG. 5 is an illustration of operations of an embodiment of the present invention.

FIG. 5 is an illustration of operations of an embodiment of the present invention. In FIG. 5, tm1 indicates time of measurement process by the CPU 113 when the interrupt signal from the circuit for generating interrupt signals 116 is in a low level and the timer interrupt time intervals are set as the long value $\Delta t1$. And, tm 2 indicates time of measurement process by the CPU 113 when the timer interrupt time intervals are set as the short value $\Delta t2$. The CPU 113 performs the digital filter process and the remaining capacity measurement process in several m seconds, for example, from the time tm 1 or tm 2, At time t0, a current is applied from the battery 102 to the load connected to the terminals T+ and T−. When the detection signal from the current detection unit 123 reaches the first reference voltage V1 and the charge and discharge current exceeds a threshold current Ith at time t1, an output of the circuit for generating interrupt signals 116 is in a low level and an interrupt is generated to the CPU 113, so that the CPU 113 immediately performs the digital filter process and the remaining capacity measurement process.

Thus, in both cases where the timer interrupt time intervals are set as $\Delta t1$ and $\Delta t2$, it is possible to measure a current without fail when a relatively large current exceeding the threshold current Ith upon power-on is consumed, so that accurate current measurement is possible. In accordance with this, it is possible to accurately detect remaining battery capacity.

[Battery Pack]

Figure 6:
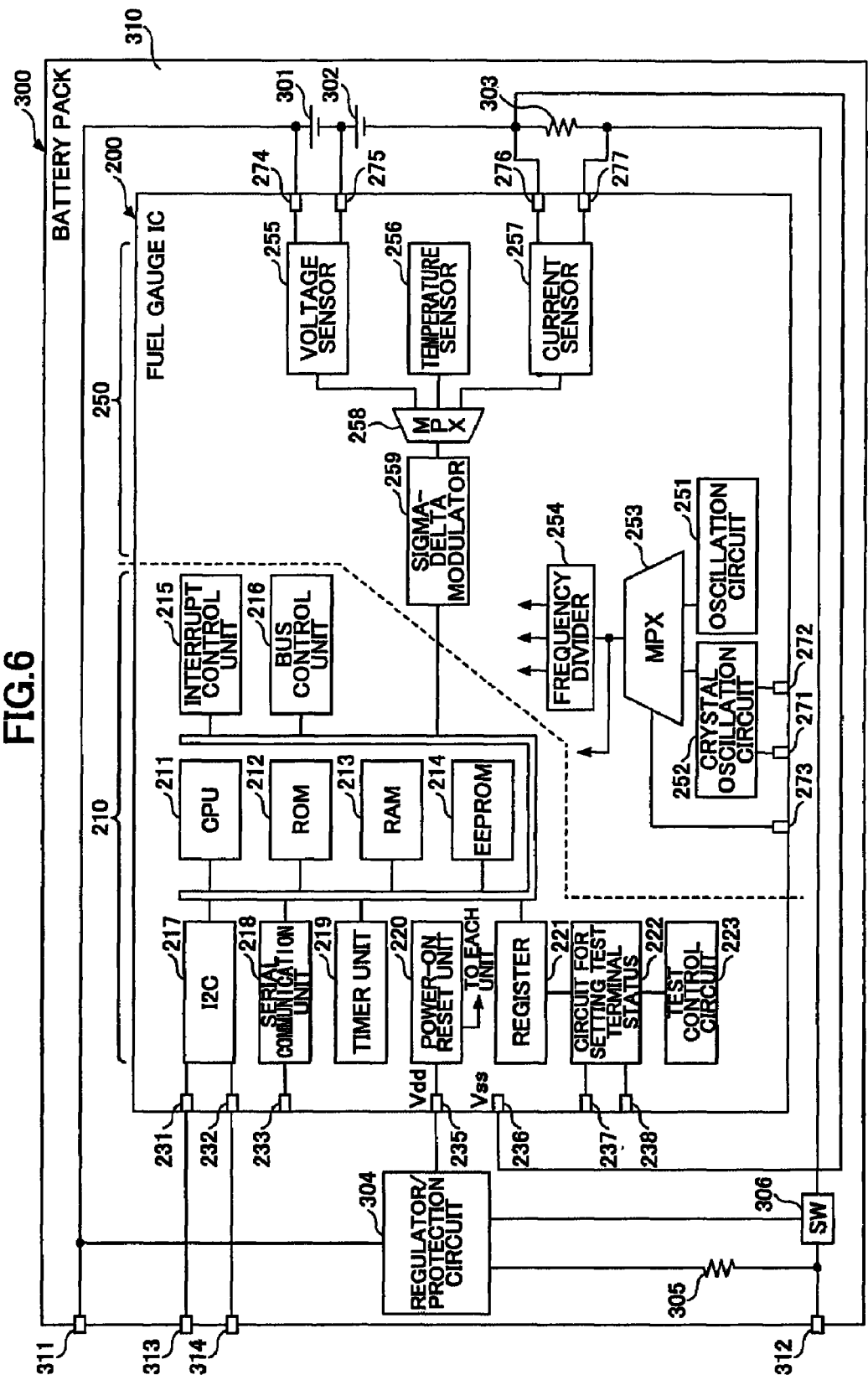
FIG. 6 is a block diagram of an embodiment of a battery pack to which a circuit according to the present invention is applied.

FIG. 6 is a block diagram of an embodiment of the battery pack to which the circuit according to the present invention is applied. In FIG. 6, a fuel gauge IC 200 as a circuit for detecting remaining battery capacity is configured as an integrated semiconductor and is substantially constructed using a digital unit 210 and an analog unit 250. In addition, in the fuel gauge IC 200, the regulator 115 shown in FIG. 1 is not disposed since the regulator/protection circuit 304 is disposed externally of the fuel gauge IC 200.

In the digital unit 210, there are disposed a CPU 211, a ROM 212, a RAM 213, an EEPROM 214, an interrupt control unit 215, a bus control unit 216, an I2C unit 217, a serial communication unit 218, a timer 219, and a power-on reset unit 220. These circuits are connected to one another via an internal bus.

The CPU 211 executes a program stored in the ROM 212 so as to control an entire portion of the fuel gauge IC 200 and performs processes and the like for integrating the charge and discharge current of the battery and calculating remaining battery capacity. In this case the RAM 213 is used as a work area. The EEPROM 214 stores trimming information and the like. The CPU 211 corresponds to the CPU 113 shown in FIG. 1, and the ROM 212, RAM 213 and EEPROM 214 correspond to the memory 114.

An interrupt request from each unit of the fuel gauge IC 200 is supplied to the interrupt control unit 215 and the interrupt control unit 215 generates an interrupt in accordance with priority of each interrupt request and notifies the interrupt to the CPU 211. The bus control unit 216 controls use of the internal bus by the circuit units.

The I2C unit 217 is connected a communication line via ports 231 and 232 and performs 2-wire serial communication. The communication unit 218 corresponds to the communication circuit 117 shown in FIG. 1. The communication unit 218 is connected to a communication line not shown in the drawings via a port 233 and performs 1-wire serial communication.

The timer 219 counts a system clock and a count value is referred to by the CPU 211. The power-on reset unit 220 detects that a power supply Vdd for a port 235 is activated and generates a reset signal so as to reset the entire portion of the fuel gauge IC 200.

In the analog unit 250, there are disposed an oscillation circuit 251, a crystal oscillation circuit 252, a multiplexer (MPX) 253, a frequency divider 254, a voltage sensor 255, a temperature sensor 256, a current sensor 257, a multiplexer 258, and a sigma-delta modulator 259.

The oscillation circuit 251 is an oscillator with PLL and outputs an oscillation signal of several MHz. The crystal oscillation circuit 252 has external quartz crystal in ports 271 and 272 for oscillation and outputs an oscillation signal of several MHz. An oscillation frequency of the crystal oscillation circuit 252 is highly accurate relative to the oscillation circuit 251.

The multiplexer 253 selects one of oscillation frequency signals output from the oscillation circuit 251 and the crystal oscillation circuit 252 based on a selection signal supplied from a port 273. The multiplexer 253 supplies the selected signal to each unit of the fuel gauge IC 200 and to the frequency divider 254. The multiplexer 253 selects an oscillation frequency signal output from the oscillation circuit 251, for example, when the selection signal is not supplied from the port 273. The frequency divider 254 generates various types of clock by dividing the system clock and supplies the generated clock to each unit of the fuel gauge IC 200.

The voltage sensor 255 detects a voltage of batteries (lithium ion batteries) 301 and 302 externally connected to each of the ports 274 and 275. Also, the voltage sensor 255 supplies an analog detection voltage to the multiplexer 258. The temperature sensor 256 detects an environmental temperature of the fuel gauge IC 200 and supplies an analog detection temperature to the multiplexer 258.

Both ends of a resistance 303 for current detection are connected to ports 276 and 277. The current sensor 257 detects a current passing through the resistance 303 in accordance with a potential difference between the ports 276 and 277 and supplies an analog detection current to the multiplexer 258.

The multiplexer 258 sequentially selects and supplies the analog detection voltage, the analog detection temperature, and the analog detection current to the sigma-delta modulator 259. The sigma-delta modulator 259 performs sigma-delta modulation on each detection value, so that pulse density modulated signals are supplied to the CPU 211 via the internal bus. The CPU 211 performs the digital filter process so as to digitize each of the detection voltage, detection temperature, and detection current. The CPU 211 calculates remaining battery capacity by integrating the charge and discharge current of the batteries. In this case, the detection temperature is used for correcting temperature.

In addition, the voltage sensor 255 corresponds to the voltage detection unit 121 shown in FIG. 1, the temperature sensor 256 to the temperature detection unit 122, the current sensor 257 to the current detection unit 123, the multiplexer 258 to the multiplexer 124, the sigma-delta modulator 259 to the sigma-delta modulator 112, and the resistance 303 to the current detection resistance Rs.

The above-mentioned fuel gauge IC 200 is stored in an enclosure 310 together with the batteries 301 and 302, the resistance 303 for current detection, the regulator/protection circuit 304, a resistance 305, and a switch 306, thereby constituting a battery pack 300. A positive electrode of the battery 301 and a power supply input terminal of the regulator/protection circuit 304 are connected to a terminal 311 of the battery pack 300. A power supply output terminal of the regulator/protection circuit 304 is connected to the port 235 of the power supply Vdd of the fuel gauge IC 200. A terminal 312 is connected to an earthing terminal of the regulator/protection circuit 304 via the resistance 305 and connected to a connection point of the resistance 303 for current detection with the port 277 via the switch 306. The regulator/protection circuit 304 stabilizes a voltage between the terminals 311 and 312 and disconnects the switch 306 for protection when the voltage is out of a predetermined range.

Further, a port 236 of a power supply Vss of the fuel gauge IC 200 is connected to a connection point of the resistance 303 for current detection with the port 276. The ports 231 and 232 of the fuel gauge IC 200 are connected to terminals 313 and 314 of the battery pack 300.

Figure 7:
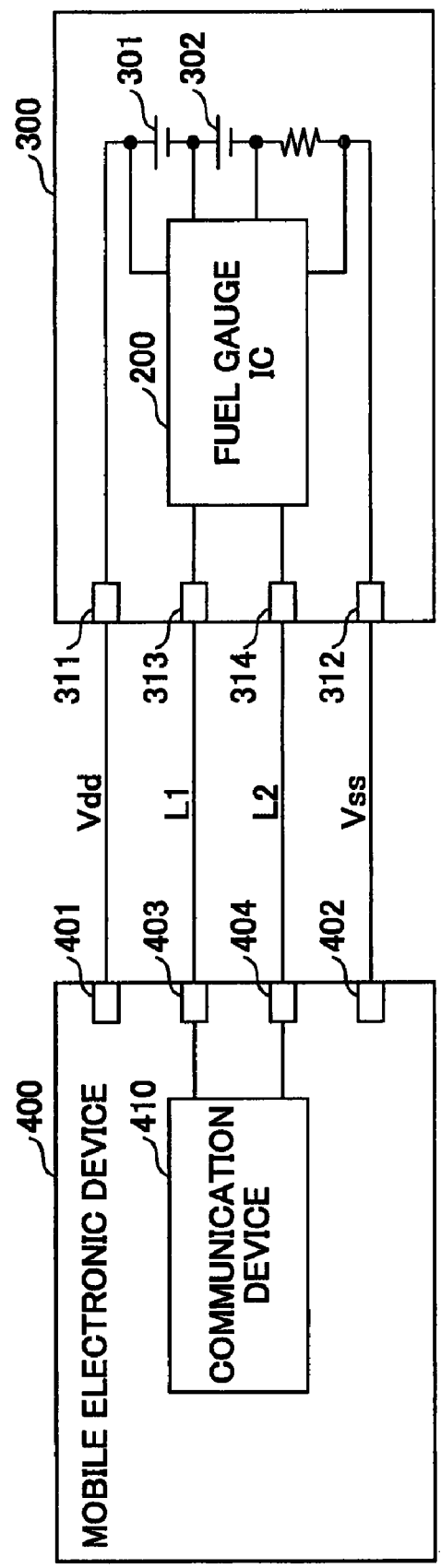
FIG. 7 is a block diagram of an embodiment of a mobile electronic device in which the battery pack in FIG. 6 is used.
Figure 8:
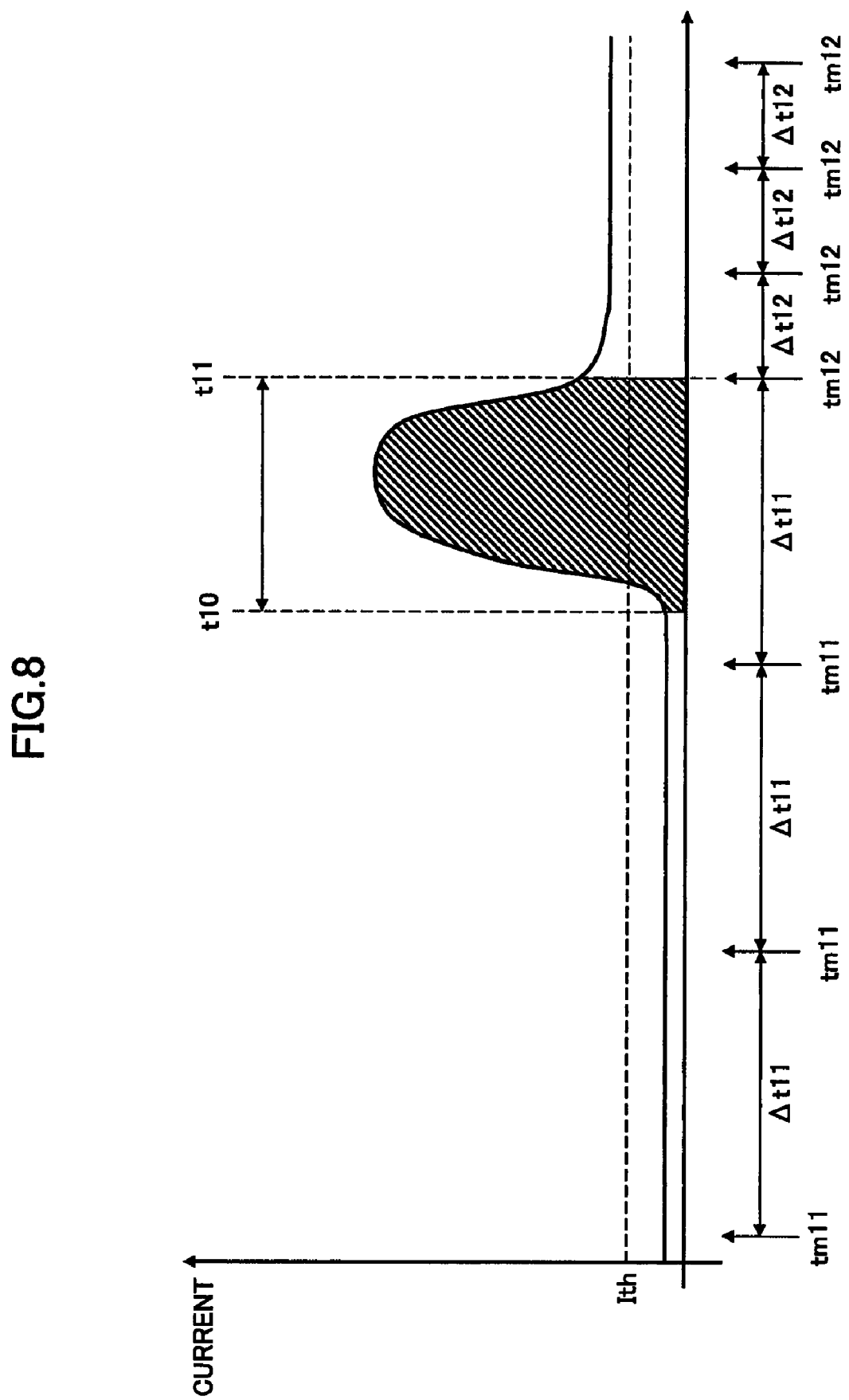
FIG. 8 is an illustration of operations of an example of a conventional circuit for detecting remaining battery capacity.

FIG. 7 is a block diagram of an embodiment of a mobile electronic device in which the battery pack 300 in FIG. 6 is used. In FIG. 7, a mobile electronic device 400 is a circuit of a body of a mobile personal computer, a digital still camera, a mobile phone, and the like. The mobile electronic device 400 includes a communication device 410.

The terminals 311 to 314 of the battery pack 300 are connected to terminals 401 and 402 of power supply Vdd and Vss of the mobile electronic device 400 and to terminals 403 and 404 to which a clock line L1 and a data line L2 are connected. In accordance with this, electric power is supplied from the batteries 301 and 302 in the battery pack 300 to the mobile electronic device 400.

In this case, the mobile electronic device 400 operates as a master and the fuel gauge IC 200 operates as a slave. Upon request from the mobile electronic device 400, the fuel gauge IC 200 returns a reply of remaining battery capacity obtained by calculation to the communication device 410 of the mobile electronic device 400.

The present invention is not limited to the specifically disclosed embodiment, and variations and modifications may be made without departing from the scope of the present invention.

The present application is based on Japanese priority application No. 2006-035595 filed Feb. 13, 2006, and No. 2007-022197 filed Jan. 31, 2007, the entire contents of which are hereby incorporated herein by reference.

What is claimed is:

1. A circuit for detecting remaining battery capacity, comprising:
   a current detection unit detecting a charge and discharge current of a battery;
   a remaining capacity measurement unit including a central processing unit (CPU), the remaining capacity measurement unit measuring remaining capacity of the battery by integrating the charge and discharge current at first time intervals and at second time intervals shorter than the first time intervals, and the CPU performing a digital filter process and a remaining capacity measurement process;

an interrupt signal generation unit generating an interrupt signal to the CPU of the remaining capacity measurement unit when the charge and discharge current exceeds a reference value and instructing the remaining capacity measurement unit to measure remaining capacity of the battery, the interrupt signal allowing the CPU to enter an awake status from a sleep status;

a voltage detection unit connected to the battery and providing a voltage detection signal;

a temperature detection unit connected to the battery and providing a temperature detection signal;

a current detection unit connected to the battery and providing a current detection signal;

a sigma-delta modulator; and a multiplexer which selects a selected detection signal from one of the voltage detection signal, the temperature detection signal, and the current detection signal, and provides the selected detection signal to the sigma-delta modulator, wherein the selection is performed based on a control signal from the CPU;

wherein the CPU judges, following the measurement of remaining capacity, whether the charge and discharge current exceeds a predetermined value, and if the charge and discharge current is not more than the predetermined value and maintained for a predetermined time, the CPU sets the time intervals for measuring the remaining capacity of the battery to the first time intervals and if the charge and discharge current exceeds the predetermined value, the CPU sets the time intervals to the second time intervals.

2. The circuit for detecting remaining battery capacity according to claim 1, wherein the current detection unit detects a voltage between both ends of a resistance where the charge and discharge current passes through, and the interrupt signal generation unit generates the interrupt signal when the voltage between both ends of the resistance where the charge and discharge current passes through exceeds a first reference value and when the voltage between both ends of the resistance where the charge and discharge current passes through is less than a second reference value lower than the first reference value.

3. The circuit for detecting remaining battery capacity according to claim 2, wherein the interrupt signal generation unit includes a window comparator.

4. The circuit for detecting remaining battery capacity according to claim 1, further including a fuel gauge integrated circuit (IC) which detects remaining battery capacity.

5. The circuit for detecting remaining battery capacity according to claim 4, wherein the fuel gauge IC is configured as an integrated semiconductor.

6. The circuit for detecting remaining battery capacity according to claim 5, wherein the fuel gauge IC includes a digital unit and an analog unit.

7. A method for detecting remaining battery capacity, comprising:

detecting a charge and discharge current of a battery;

measuring remaining capacity of the battery by integrating the charge and discharge current at first time intervals and at second time intervals shorter than the first time intervals, and performing a digital filter process and a remaining capacity measurement process;

generating an interrupt signal to a CPU of the remaining capacity measurement unit when the charge and discharge current exceeds a reference value and instructing the remaining capacity measurement unit to measure remaining capacity of the battery, the interrupt signal allowing the CPU to enter an awake status from a sleep status;

judging, following the measurement of remaining capacity, whether the charge and discharge current exceeds a predetermined value;

after generating an interrupt signal, controlling a multiplexer to sequentially select, in any order, a voltage detection signal, temperature detection signal, and current detection signal;

converting the voltage detection signal, temperature detection signal, and current detection signal, into pulse density multiplexed (PDM) signals via sigma-delta modulation; and digitizing the PDM signals via a digital filter process;

wherein, if the charge and discharge current is not more than the predetermined value and maintained for a predetermined time, the CPU sets the time intervals for measuring the remaining capacity of the battery to the first time intervals and if the charge and discharge current exceeds the predetermined value, the CPU sets the time intervals to the second time intervals.

8. The method for detecting remaining battery capacity according to claim 7, further including detecting a voltage between both ends of a resistance where the charge and discharge current passes through, and generating the interrupt signal when the voltage between both ends of the resistance where the charge and discharge current passes through exceeds a first reference value and when the voltage between both ends of the resistance where the charge and discharge current passes through is less than a second reference value lower than the first reference value.

9. The method for detecting remaining battery capacity according to claim 8, further including performing a window comparison.

* * * * *